United States Patent [19]

Kawakami

[11] Patent Number: 5,744,936
[45] Date of Patent: Apr. 28, 1998

[54] ELECTRIC POWER ACCUMULATING APPARATUS AND ELECTRIC POWER SYSTEM

[75] Inventor: Soichiro Kawakami, Nara, Japan

[73] Assignee: Canon Kabushiki Kaisha, Tokyo, Japan

[21] Appl. No.: 789,601

[22] Filed: Jan. 24, 1997

Related U.S. Application Data

[63] Continuation of Ser. No. 187,014, Jan. 27, 1994, abandoned.

[30] Foreign Application Priority Data

Jan. 29, 1993 [JP] Japan .................. 5-013722

[51] Int. Cl.⁶ .................. H02J 7/00
[52] U.S. Cl. .................. 320/120; 320/122
[58] Field of Search .................. 320/6, 7, 15, 16, 320/17, 18

[56] References Cited

U.S. PATENT DOCUMENTS

| | | | |
|---|---|---|---|
| 3,470,441 | 9/1969 | Ford et al. | 320/6 |
| 3,928,791 | 12/1975 | Mullersman | 320/7 |
| 3,930,192 | 12/1975 | Dinkler | 320/15 |
| 4,061,955 | 12/1977 | Thomas et al. | 320/18 X |
| 4,084,124 | 4/1978 | Kapustka | 320/9 |
| 4,287,267 | 9/1981 | Whittlesey et al. | 429/49 |
| 4,352,067 | 9/1982 | Ottone | 324/434 |
| 4,502,000 | 2/1985 | Mashikian | 320/6 |
| 4,616,170 | 10/1986 | Ustöger | 320/5 |
| 4,839,574 | 6/1989 | Takabayashi | 320/3 |
| 5,153,496 | 10/1992 | LaForge | 320/17 |
| 5,422,558 | 6/1995 | Stewart | 320/7 |

FOREIGN PATENT DOCUMENTS

| | | |
|---|---|---|
| 0013005 | 7/1980 | European Pat. Off. . |
| 0251198 | 1/1988 | European Pat. Off. . |
| 84139589 | 9/1983 | U.S.S.R. . |

*Primary Examiner*—Edward Tso
*Attorney, Agent, or Firm*—Fitzpatrick, Cella, Harper & Scinto

[57] ABSTRACT

In an electric power accumulating apparatus utilizing a parallel arrangement of plural groups of secondary batteries in which the secondary batteries of each group are arranged in series, an abnormality in each of the secondary batteries is detected. The output terminals of the secondary battery showing abnormality are electrically detached and the detached terminals to which the secondary battery showing abnormality have been connected are shortcircuited. An auxiliary power source or a DC/DC converter compensates for the voltage corresponding to the detached battery to provide improved safety, stable output and extended service life.

49 Claims, 10 Drawing Sheets

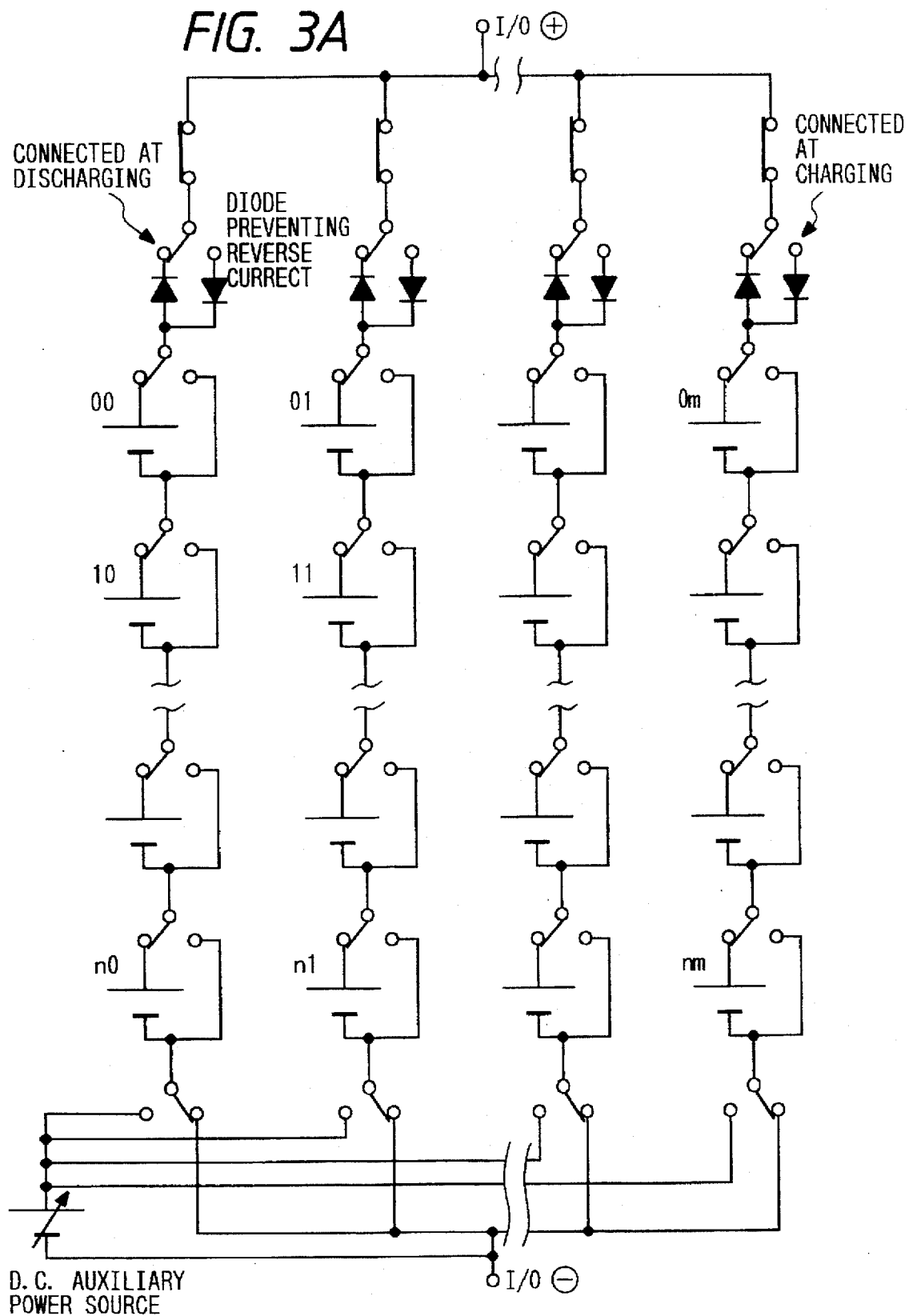

1

ELECTRIC POWER ACCUMULATING APPARATUS AND ELECTRIC POWER SYSTEM

This application is a continuation of application Ser. No. 08/187,014, filed Jan. 27, 1994, now abandoned.

BACKGROUND OF THE INVENTION

1. Field of the Invention

The present invention relates to an electric power accumulating apparatus composed of mutually connected plural secondary batteries, and more particularly to such an electric power accumulating apparatus capable of proper and stable operation for a prolonged period even when an abnormality occurs in the unit secondary battery, and it also relates to an electric power system composed of mutually connected plural secondary batteries and adapted to supply the output of said plural secondary batteries to a load.

2. Related Background Art

Because the construction of new steam power plants is anticipated to become difficult due to the recent forecast for warming-up of the earth by the green-house effect resultion from the increase of carbon dioxide, there is being proposed the load conditioner for effecting so-called load levelling, by accumulating the electric power during the night time in secondary batteries provided at the ordinary households in order to achieve effective utilization of the power generators. Also developmental programs are being pursued for a secondary battery of a high energy density for realizing electric automobiles free from discharge of air-polluting substances.

The secondary battery to be employed in such electric automobiles and load conditioners, for which a high power output is required, will be probably composed of an electric power accumulating apparatus consisting of an array of plural secondary batteries connected in serial or parallel manner, in view of the difficulty of manufacture of a large-sized single battery. However, since unit batteries of completely uniform performance are difficult to manufacture, there will inevitably be some difference in the service lives of such unit batteries, and, in the prolonged use of such electric power accumulating apparatus composed of plural unit batteries connected as mentioned above. If any of the unit batteries runs out of its service life, the performance of such electric power accumulating apparatus will be detrimentally affected by the influence of such life-exhausted unit battery. Particularly a battery employing lithium or zinc as the active cathode substance is prone to generate dendolite of lithium or zinc at the charging operation, thus showing a higher possibility of shortcircuiting in comparison with other batteries. The lithium battery, nickel-zinc battery, air-zinc battery, bromine-zinc battery, silver oxide-zinc battery etc. are promising candidates for the secondary battery for future power accumulation because of their high energy density, but the above-mentioned point will be serious if a high power output is seeked for by a serial or parallel array of plural batteries. For example, in an electric power accumulating apparatus composed of a parallel array of plural unit secondary batteries connected to an external load, if one of the unit batteries is shortcircuited internally during the discharging operation of said apparatus, the electric power is consumed also in such internal shortcircuited battery, thus reducing the output of the electric power accumulating apparatus. Also decomposition of the electrolyte may result in the internal shortcircuited battery. Also in the charging operation, the charging efficiency is lost because of the electric power consumption in the shortcircuited battery. Also in an electric power accumulating apparatus composed of a serial connection of plural unit batteries, the internal shortcircuiting of a unit battery will similarly lead to the reduced output of the apparatus and the decomposition of the electrolyte of thus shortcircuited battery. Also a power source may be a fatal defect for the system equipment utilizing such power source, unless stable and constant power supply can be assured.

FIG. 9 is a circuit diagram showing an electric power accumulating apparatus, consisting of a parallel electrical connection of m unit secondary batteries, connected to an external load and shown in the discharge state. For example, if the third battery is shortcircuited, a current flows into said third battery, from other connected batteries, thereby causing power consumption and generating heat, and eventually resulting in the decomposition of the electrolyte. With such shortcircuiting of the third battery, the current supplied to the external load decreases abruptly.

FIG. 10 is a circuit diagram showing an electric power accumulating apparatus, consisting of a serial electrical connection of n unit secondary batteries, connected to a charger and shown in the charging state. For example if the third battery is shortcircuited, the electric power is not used for charging therein but consumed as heat, eventually resulting in the decomposition of the electrolyte.

It will be understood from the examples shown in FIGS. 9 and 10 that, in an electric power accumulating apparatus composed of a parallel or serial connection of plural secondary batteries, a failure such as shortcircuiting in a secondary battery will deteriorate the efficiency of charging and discharging, and may lead to troubles such as fire.

Consequently, in the electric power accumulating apparatus composed of a serial or parallel electrical connection of plural secondary batteries, there is desired the development of a safe system capable of stable electric power supply, without extreme deterioration in the efficiency of the charging and discharging and without the danger of troubles such as fire, even in case of an abnormality in the component unit battery.

SUMMARY OF THE INVENTION

The object of the present invention is to resolve the drawbacks associated with the above-explained electric power accumulating apparatus consisting of plural secondary batteries and to provide a safer electric power accumulating apparatus capable of supplying a stable output.

In the course of an investigation for resolving the above-mentioned drawbacks of the prior art, the present inventors have found that, if abnormality occurs in a unit battery in the course of function of the electric power accumulating apparatus consisting of plural secondary batteries mutually connected to obtain a high output, it is possible to minimize the decrease in the output of the apparatus, to reduce the loss in the efficiency at the charging and the possibility of troubles, and to secure the service life of the unit batteries constituting the electric power accumulating apparatus by electrically detaching such abnormal battery, and to further suppress the loss in the efficiency of utilization of the accumulated electric energy by providing means for compensating the voltage drop corresponding to the detached battery.

According to the present invention, there is provided an electric power accumulating apparatus provided with plural secondary batteries connecting in a serial and/or parallel array, comprising means for detecting abnormality in each of said secondary batteries, means for electrically detaching the output terminals of a secondary battery in which abnormality is generated and, in case of a serial connection, simultaneously shortcircuiting the terminals to which said abnormal unit battery is connected, and means for compensating the voltage corresponding to the detached unit battery.

According to the present invention, there is also provided an electric power system provided with a power source apparatus having plural secondary batteries connected in a serial and/or parallel array and a load electrically connected to said power source apparatus, comprising means for detecting abnormality in each of said secondary batteries, means for electrically detaching the output terminals of a secondary battery in which abnormality is generated and, in case of a serial connection, simultaneously shortcircuiting the terminals to which said abnormal unit battery is connected, and means for compensating the voltage corresponding to the detached unit battery.

Said secondary batteries may include a parallel or serial connection by a laminated or spiral structure provided within a battery case, or may be composed of a set of two or more batteries externally connected in parallel or serial manner. For enabling detailed inspection of the abnormality, each unit battery is preferably constructed as a separate battery housed in a battery case.

The above-mentioned electric power accumulating apparatus of the present invention may be further provided, depending on the application thereof, with means for providing a notice for requesting the battery replacement, simultaneously with the detachment of the battery involving abnormality; means for providing a notice requesting replacement of such abnormal battery only; means for informing the approximate timing of replacement of each of the connected batteries; means for restoring the system by connection, with other batteries, of the new battery after the abnormal battery is replaced; stabilizing means for releasing a stabilized constant voltage; means for displaying the amount of remaining electric power of the electric power accumulating apparatus; means for controlling the charging and discharging states and displaying whether the apparatus is in the charging, discharging or stand-by state; rectifying means for a charger, for converting the commercial AC current into a DC current; noise eliminating means; means for converting the DC current into an AC output current; means for elevating the DC voltage etc.

The electric power accumulating apparatus of the present invention need not necessarily be provided with rectifying means, in case it is used as the power source for an electric automobile and if charging stations are well provided. When the electric power accumulating apparatus of the present invention is used for driving an AC-operated equipment, said apparatus is preferably equipped with an inverter for converting the DC current into the AC current. When said apparatus is used together with a commercial power source, as in the case of load conditioner, there is preferably provided means for converting the output of said apparatus into the commercial power supply. Furthermore, the electric power accumulating apparatus of the present invention is preferably provided with an input terminal for receiving the output of other power supplies such as a solar cell or a fuel cell. Also in case an elevation of the DC output of the secondary battery is desired, a DC-DC converter is preferably provided in the electric power accumulating apparatus of the present invention.

BRIEF DESCRIPTION OF THE DRAWINGS

FIGS. 3A and 3B are circuit diagrams of secondary battery arrays consisting of a parallel-serial connection of unit secondary batteries and switching elements and constituting the principal part of the electric power accumulating apparatus of the present invention;

DETAILED DESCRIPTION OF THE PREFERRED EMBODIMENTS

Now the present invention will be clarified in detail by preferred embodiments thereof with reference to the attached drawings.

Figure 1A:
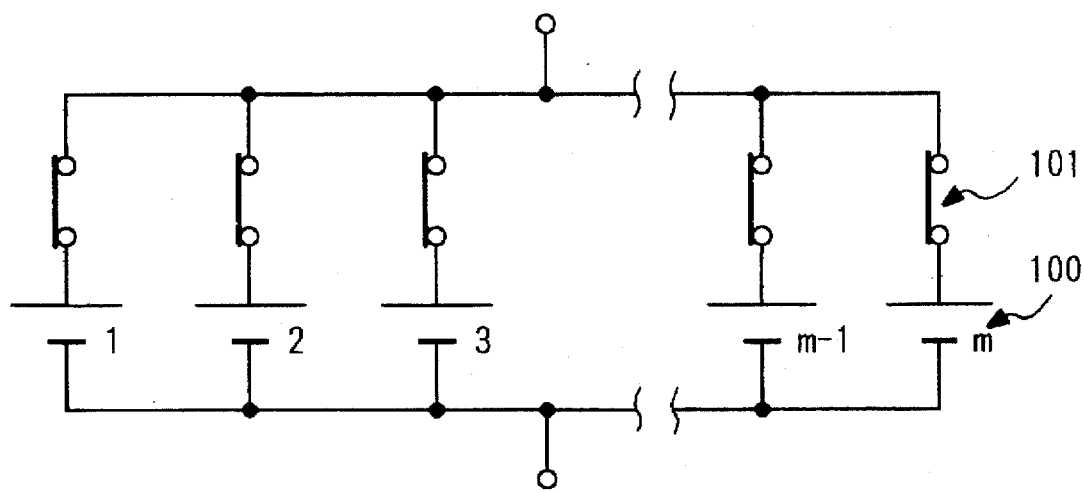
FIGS. 1A and 1B are circuit diagrams of a secondary battery array consisting of a parallel connection of unit secondary batteries and switching elements and constituting the principal part of the electric power accumulating apparatus of the present invention, respectively in a normal state and in a state with abnormality in a secondary battery.
Figure 1B:
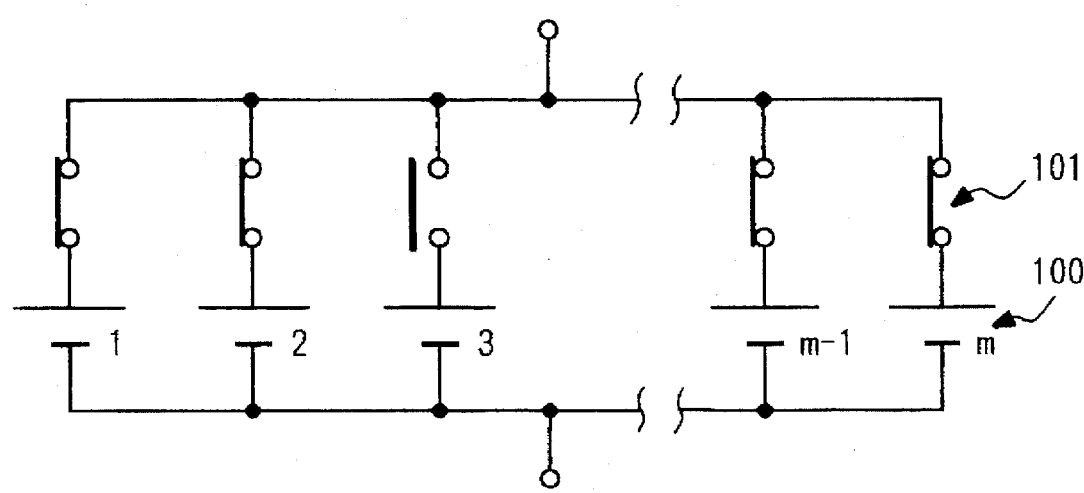

FIG. 1A is a circuit diagram of an electric power accumulating apparatus of the present invention, in which a higher capacity is achieved by a parallel connection of plural secondary batteries. In FIG. 1A, m unit batteries 100 are connected in parallel, and a switching element 101 is serially connected to each unit battery. When abnormality such as shortcircuiting occurs for example in the 3rd unit battery shown in FIG. 1A, the switching element associated thereto is actuated to electrically detach the abnormal battery as shown in FIG. 1B, whereby the detrimental effect to the system can be minimized.

Figure 2:
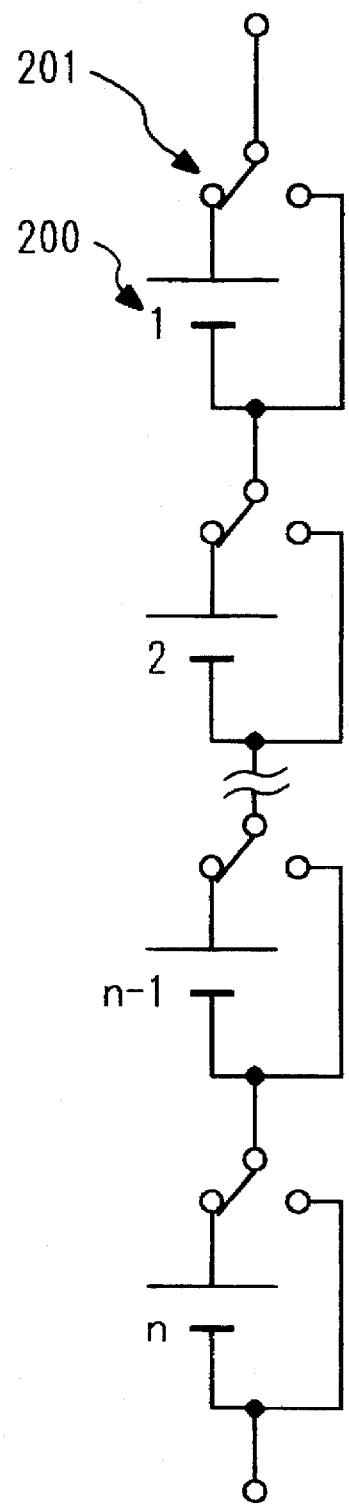
FIG. 2 is a circuit diagram of a secondary battery array consisting of a serial connection of unit secondary batteries and switching elements and constituting the principal part of the electric power accumulating apparatus of the present invention.

FIG. 2 is a circuit diagram of an electric power accumulating apparatus of the present invention, in which a higher voltage is obtained by a serial connection of plural secondary batteries. In FIG. 2, n unit batteries 200 are connected in series, and a switching element 201 is serially connected to each unit battery in such a manner, in case of abnormality in a unit battery, as to electrically detach the abnormal battery and to shortcircuit the detached part.

Figure 3B:
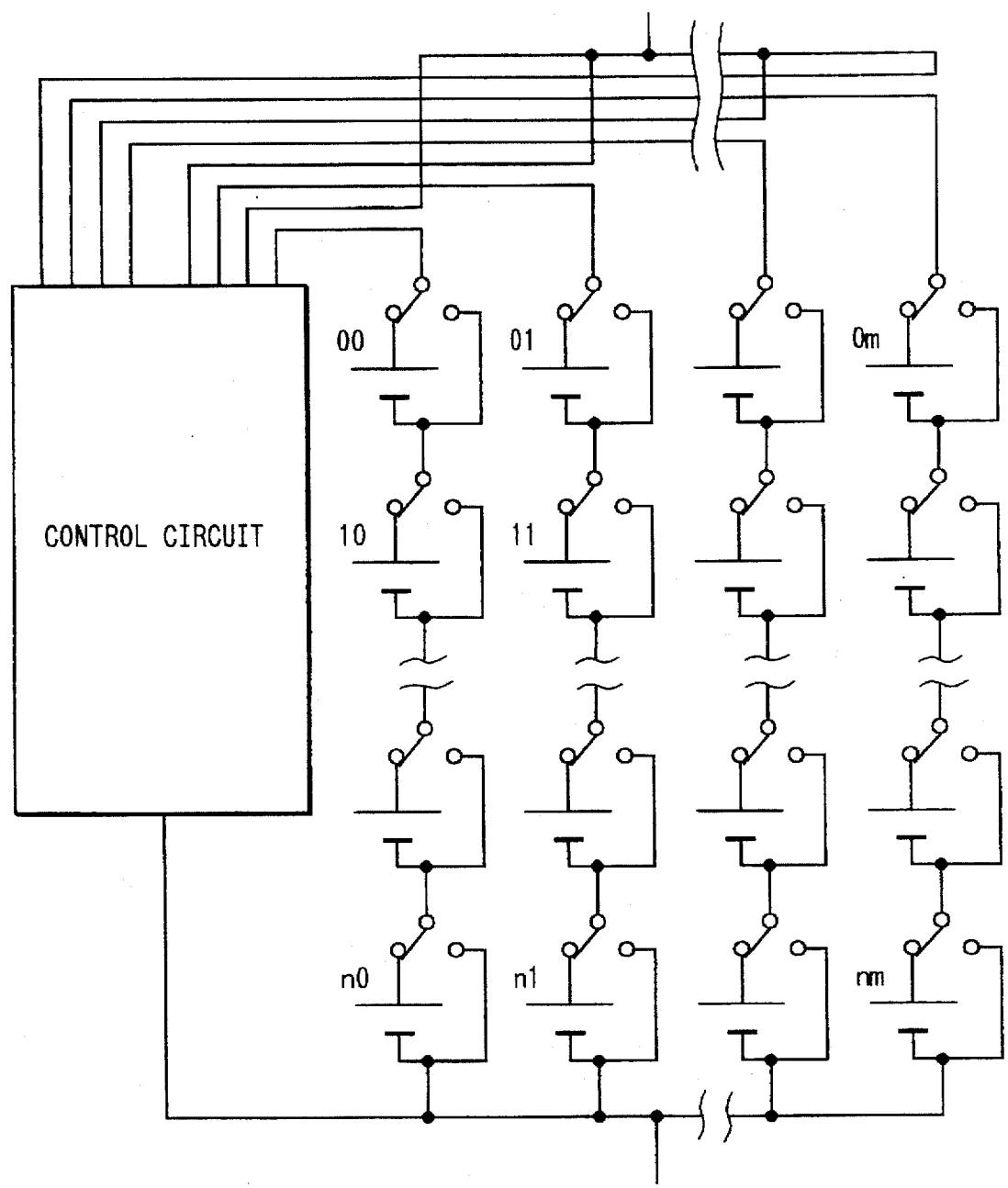

FIG. 3A is a circuit diagram of an electric power accumulating apparatus in which a higher voltage and a higher capacity are attained by a serial-parallel connection of plural secondary batteries ((m+1) serial connections, each consisting of (n+1) batteries, being connected in parallel) and in which an auxiliary DC power source is provided. As in the circuit shown in FIG. 2, a switching element is serially connected to each unit battery in such a manner as to provide a stable output voltage even when an abnormal battery is electrically detached. Also there are provided diodes for preventing reverse current in the charging and discharging operations. When a unit battery of deteriorated performance is detached and the terminals thereof are shortcircuits in the configuration shown in FIG. 3A, the output voltage of the column containing such detached battery is reduced and becomes lower than that of other normal columns, so that the total current output of the apparatus is lowered. However such loss in the current output can be avoided by connecting an auxiliary DC power source, by a switching operation, to the column of the reduced voltage, in order to compensate the voltage. It is also possible to control the balance of the voltages of the columns, each consisting of a serial connection of batteries, by connecting said columns, as shown in FIG. 3B, to a control circuit incorporating DC-DC converters, thereby elevating the reduced voltage.

If such means for compensating the deficient voltage is not provided, the level of discharge of the batteries constituting the column from which the abnormal battery is detached becomes different from that in other normal batteries, whereby the service lives of all the secondary batteries constituting the electric power accumulating apparatus may be shortened.

Figure 4:
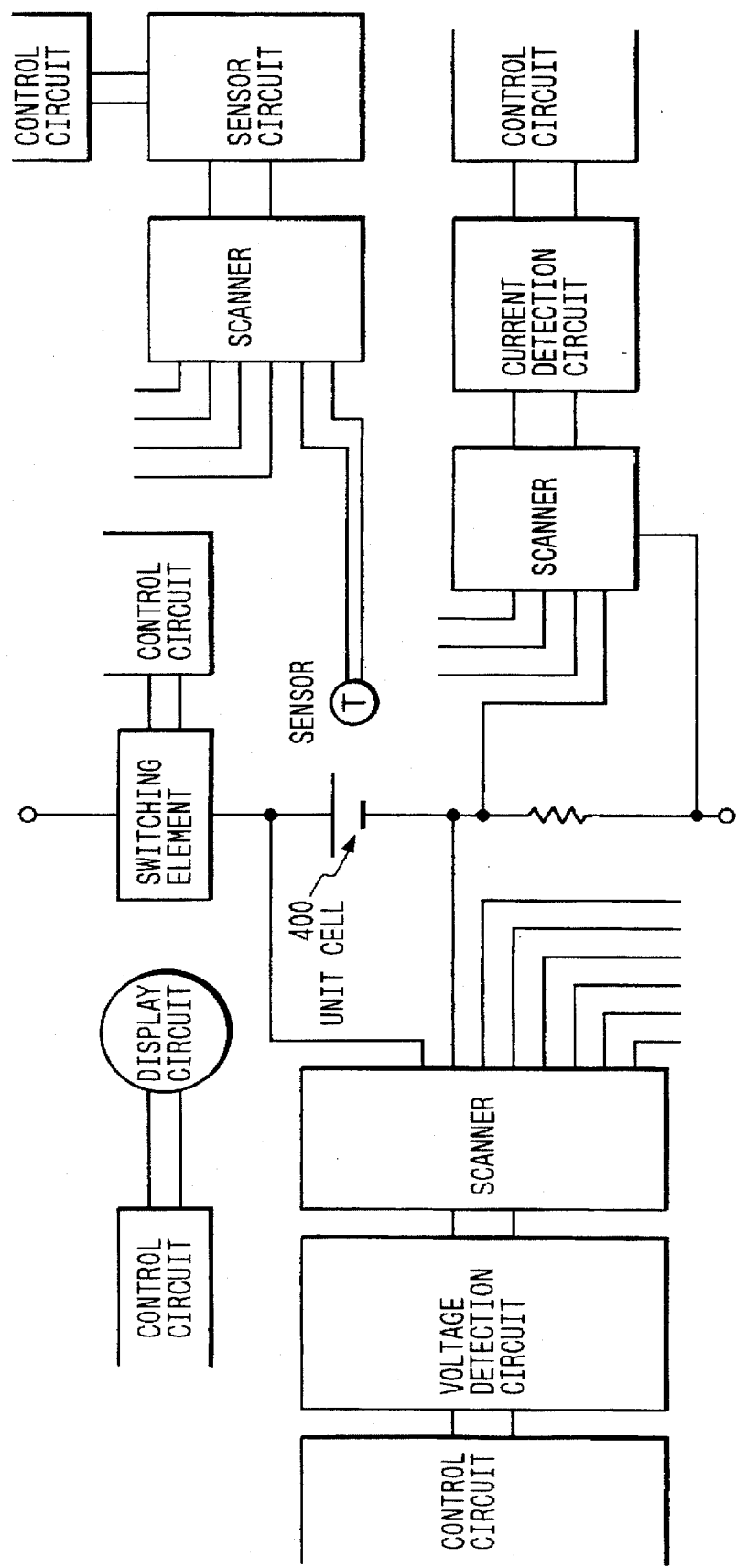
FIG. 4 is a circuit diagram of peripheral circuits associated with the unit secondary batteries in the electric power accumulating apparatus of the present invention.

FIG. 4 is a diagram showing an example of the practical circuit structure associated with the unit battery 400 featuring the electric power accumulating apparatus of the present invention. The unit battery 400 is serially connected with the switching element, and is equipped with a sensor, the output of which supplied, for example through a scanner circuit, to a sensor circuit. Also across the unit battery there is connected a voltage detecting circuit, for example through a scanner circuit, and there is also provided a current detecting circuit, for example through a scanner circuit. Said switching element, sensor circuit, voltage detecting circuit and current detecting circuit are connected to a control circuit, to which further connected is a display circuit for displaying the information of each unit battery and of the electric power accumulating apparatus. In the circuits shown in FIG. 4, the abnormality in temperature or strain in the unit battery is detected by sensors such as a temperature sensor or a strain sensor, while abnormality in voltage is detected by the voltage detecting circuit, and abnormality in current is detected by the current detecting circuit. Thus the control circuit activates the switching element to detach the battery showing such abnormality, while it at the same time stabilizes the output of the electric power accumulating apparatus, and provides a display requesting the replacement of the abnormal battery. After the abnormal secondary battery is replaced with a new proper battery, the control circuit activates the switching element to connect the new battery to the system.

It will be understood from the foregoing description relating to FIGS. 1A to 4 that the present invention is particularly effective in an electric power accumulating apparatus utilizing secondary batteries prone to show shortcircuiting by dendolite generation at the charging operation or employing combustible organic solvent, such as nickel-zinc battery, air-zinc battery, bromine-zinc battery, silver oxide-zinc battery or lithium battery, in a serial-parallel array.

Figure 5:
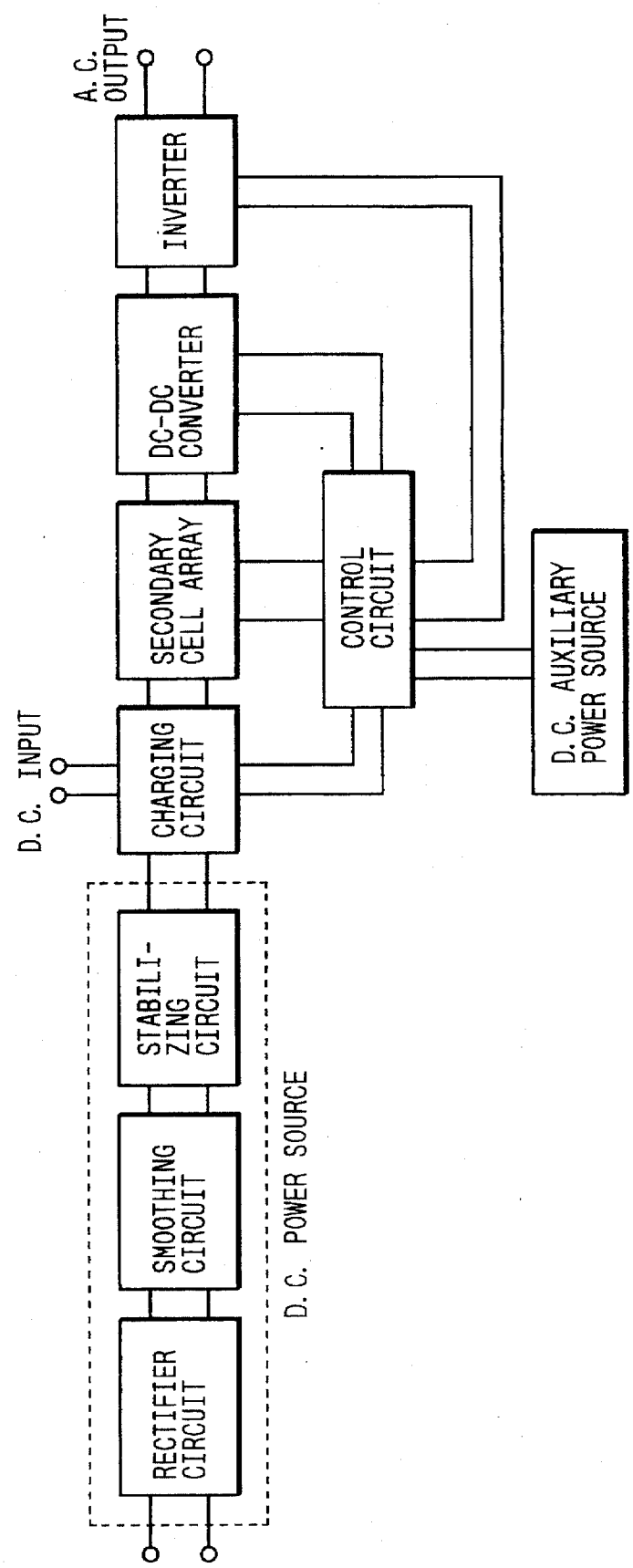
FIG. 5 is a block diagram showing an example of the configuration of the entire electric power accumulating apparatus of the present invention.
Figure 6:
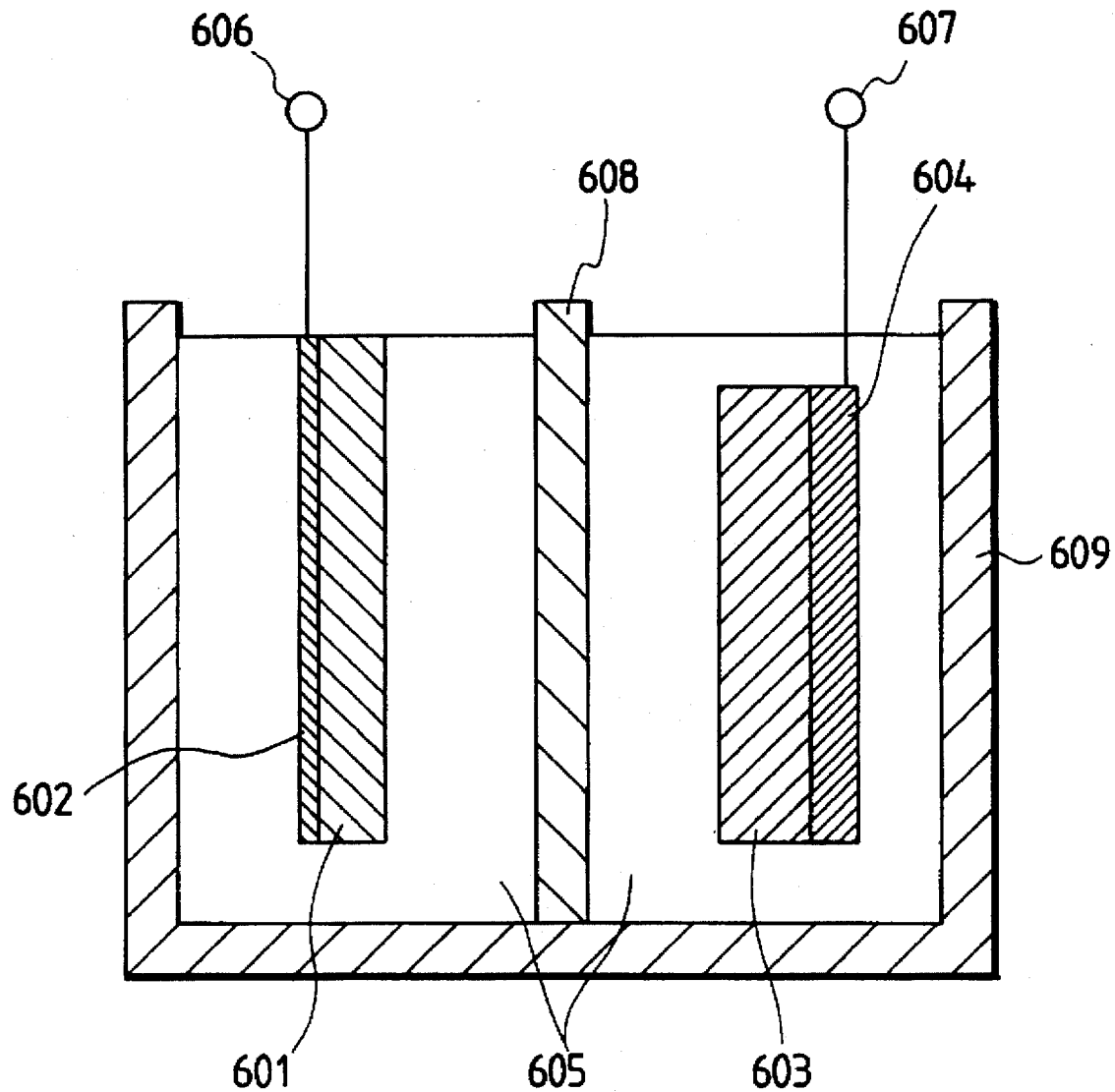
FIG. 6 is a schematic view showing the basic configuration of the secondary battery to be employed in the electric power accumulating apparatus of the present invention.

FIG. 5 is a block diagram showing an example of the electric power accumulating apparatus of the present invention, composed of a DC power supply circuit consisting of a rectifier circuit, a smoothing circuit and a stabilizer circuit for converting a commercial AC power into a DC power for charging; a charging circuit for charging a secondary battery array by the output of said DC power supply circuit or an external DC power source such as a fuel cell; a secondary battery array for accumulating the electric energy, associated with switching elements and sensors; an auxiliary DC power source constituting voltage compensating means in case the abnormal battery is detached; a DC-DC converter for elevating the output voltage from the secondary battery array in case said voltage does not reach the operating voltage of the equipment to be used; an inverter for converting the DC current into an AC current for driving an AC-operated equipment; and a control circuit for controlling the foregoing circuits. Fuzzy control may be employed in said control circuit. The auxiliary power source for driving the control circuit etc. and the spare power source for stabilizing the output balance are not illustrated in FIG. 5.

Means for Abnormal Battery Detachment and Shortcircuiting

The electric power accumulating apparatus of the present invention is provided with means for detaching the electrical connection of output terminals of the unit secondary battery showing abnormality, and, in case of a serial connection, for shortcircuits the terminals to which the abnormal unit battery has been connected. The switching element for such electrical detachment can be composed of a transistor or a thyristor, but is preferably composed of a relay because it is simpler and requires a less power consumption.

Such relay can be driven, for example, by a transistor, a driver IC with open collector output, or a transistor array of Darlington connection. There is preferably employed a latching relay, which retains the state of contact even after the driving current is terminated, once the contact is actuated by energization of a coil with the driving current, since such latching relay can reduce the electric power consumption by pulsed operation for example with a discharge pulse of a capacitor. Among such latching relays, there is preferably employed a two-coil type relay, since, in a one-coil type, the driving current has to be inverted in order to invert the contact.

By equipping each unit battery with a temperature-sensitive normally-open leed switch, in which the magnetic flux from a magnet is controlled by temperature-sensitive ferrite to on/off control the contact of a leed switch, and connecting said leed switch to the relay driver, the unit battery can be detected from the electric power accumulating apparatus when said battery exceeds a certain temperature. Said normally-open temperature-sensitive leed switch may also be replaced by a NTC (negative temperature coefficient) thermistor or a PTC (positive temperature coefficient) thermistor. Also each unit battery may be serially provided with the PTC thermistor, in order to detach said unit battery from the electric power accumulating apparatus in case of an abnormal rise in temperature.

Means for Detecting Battery Abnormality

Abnormality in battery may be detected from the voltage, current, temperature or strain of each unit battery. The current is detected after conversion into a voltage. The temperature is detected by a temperature sensor.

Temperature Sensor

Examples of the temperature sensor include thermocouple, temperature-measuring platinum resistor, TSR (temperature-sensitive resistor), thermistor, transistor, diode, IC temperature sensor, optical fiber thermometer and crystal thermometer.

The temperature sensor and the sensor circuit convert the temperature of each unit battery into a voltage, and detect the abnormality when the temperature reaches an abnormal value or higher, utilizing a comparator receiving a voltage corresponding to the threshold value of the abnormal temperature, as a reference input signal.

Means for Compensating Voltage Corresponding to the Detached Abnormal Battery

An auxiliary DC power source, principally composed of a secondary battery, is connected to the serial array of batteries, from which the abnormal battery is electrically detached, in the electric power accumulating apparatus, thereby compensating the deficient voltage in the discharging operation of said apparatus.

Since said auxiliary power-source is used for a relatively short period until the abnormal battery is replaced by a proper one, the secondary battery constituting said auxiliary power source can have an electric capacity smaller than that of the secondary batteries principally constituting the electric power accumulating apparatus. Said secondary battery constituting the auxiliary power source may be different in the kind from those constituting the electric power accumulating apparatus.

Compensation of the voltage corresponding to the detached abnormal battery may also be achieved by achieved by elevating, for example by a DC-DC converter, the output of only the serial battery array of which voltage has become deficient by the detachment of the abnormal unit battery, to the normal voltage, before parallel connection to other serial battery arrays of normal output voltage. In such case the current of the serial battery array of the deficient voltage has to be controlled according to the level of discharge of other normal serial battery arrays, but such configuration allows compacting to the entire electric power accumulating apparatus in comparison with the former case of the auxiliary power source employing a secondary battery, in consideration of the space thereof.

Said case of utilizing the auxiliary power source employing the secondary battery is preferable in comparison with the case of utilizing a voltage elevating circuit such as a DC-DC converter, because of a simpler circuit structure and a smaller loss in the output current of the electric power accumulating apparatus.

Means for Requesting Replacement of the Abnormal Battery

After the abnormality is detected by the above-explained means a display is provided by light-emitting means such as an LED or on a display unit, for requesting the replacement of the abnormal battery.

Means for Informing Approximate Timing of Replacement of the Batteries

A timer is activated from the start of use of individual batteries constituting the electric power accumulating apparatus, and the timing of replacement is informed, based on the average service life of the batteries calculated from the accumulated time of use and the conditions of charging and discharging.

The service life is calculated from the accumulated time of use or the accumulated number of charging and discharging of the unit battery, utilizing an integrating device based on a digital IC consisting of a V-F converter for generating pulses proportional to the input voltage or current, and a counter, or utilizing an electrochemical integrating device.

There is also provided a circuit for clearing the accumulated value obtained by the above-explained means, in case the batteries are replaced by new ones. In this manner there can be calculated the approximate timing of replacement of the batteries.

The electrochemical integrating device retains the amount of electricity by integrating the current passing through said device, utilizing a dissolving or precipitating phenomenon of a substance, based on a reaction at the electrode-electrolyte interface. Examples of such device include an FC timer consisting of mercury and electrolyte liquid, an E-cell utilizing the principle of electroplating, a couliode, a life element (electrochemical switching element), a variable resistance element, a memoriode consisting of a solid electrolyte and memorizing the passing amount of electricity as a potential, and an LM element (potential-memorizing electrochemical element).

Connecting Means for the Replacing Batteries

After the replacement of the secondary batteries of the electric power accumulating apparatus with new ones, the means actuates the switching elements to connect the new batteries to the system and resets the timer.

DC-DC converter

If a voltage higher than the output voltage of the secondary batteries is required, there is employed a DC-DC converter, which provides a high voltage different from the input voltage. Said DC-DC converter can be that utilizing the magnetic characteristics of transformer such as the Royer's circuit effecting self-excited oscillation with two transistors and an output transformer to generate a square wave, or Jensen's circuit constituting a magnetic multivibrator utilizing two transformers, or that utilizing a capacitor charge pump. Also for obtaining a high voltage there can be utilized the Cockcroft-Walton multiple voltage rectification circuit composed of a serial array of diodes and capacitors, in combination with the Jensen's oscillator circuit equipped with a series regulator.

Inverter

When the electric power accumulating apparatus of the present invention is used for driving an equipment to be operated with the commercial AC power, the apparatus is equipped with an inverter for converting DC current into AC current.

The inverters are classified into voltage inverters utilizing power transistor or GTO (gate turn-off) thyristor, and current inverters utilizing thyristor, and the voltage inverters include those of PWM (pulse width modulation) type and those of PAM (pulse amplitude modulation) type. The PWM method utilizes a constant DC input voltage, and controls the output voltage by generating plural pulses within a half cycle time of the output voltage and varying the width of said pulses. On the other hand, the PAM method generates a square wave in the half cycle time of a basic frequency, and controls the output voltage by varying the wave height, and voltage control is required for the input DC voltage.

The PWM method is preferably employed in the inverter to be used in the electric power accumulating apparatus of the present invention.

Also in order to obtain an output wave form closer to the sinusoidal form, there can be employed a multiplex inverter in which plural inverters are multiplexed to cancel harmonic waves, thereby improving the output wave form.

Means for Displaying Accumulated Electric Capacity

The remaining electric capacity of the electric power accumulating apparatus is displayed by a display unit utilizing liquid crystal or a cathode ray tube, or by light-emitting diodes. Said remaining electric capacity can be calculated from the terminal voltage of the batteries, in case said batteries are of the type in which the terminal voltage gradually decreases with the discharging. In the batteries of the type in which the terminal voltage decreases abruptly with the discharge, the remaining electric capacity is calculated from the efficiencies of charging and discharging, the discharge conditions and the cumulative amount of discharge.

Means for Controlling Charging and Discharging

The means charges the secondary batteries of the electric power accumulating apparatus under a charging condition matching the kind of said batteries and the remaining electric capacity of the electric power accumulating apparatus.

Also if there is required an output exceeding the discharging ability of the electric power accumulating apparatus, said means effects control in such a manner as to another power source such as a fuel cell or a commercial power supply in combination, or to switch to another power source if the electric power accumulating apparatus is in the charging state.

Charging Method

The secondary batteries in the electric power accumulating apparatus are charged in the following manner with a DC power source.

For the batteries connected in parallel as shown in FIGS. 1A and 1B, there is preferably employed a method of charging plural batteries with a constant voltage until the voltage of the batteries becomes constant, or a method of charging a predetermined amount of electricity with a constant voltage. Otherwise there may be employed a method of charging a predetermined amount of electricity in each battery with a constant current, after each battery is detached from the apparatus.

For the serially connected batteries as shown in FIG. 2, there is preferably employed a method of charging a predetermined amount of electricity collectively in the plural batteries with a constant current, or a method of charging the batteries with a constant current until the voltage of the batteries becomes constant. Otherwise there may also be employed a method of charging a predetermined amount of electricity in each battery, after each battery is detached from the apparatus.

In addition to the cycle charging method, there may be employed the floating charging method. There is preferably prepared a charging circuit with a charging method selected from those explained above, or a programmable charging circuit, according to the kind of the secondary batteries and the purpose of the output of the electric power accumulating apparatus.

Rectifying Means

Rectifying means, for converting the commercial AC current into a DC current for charging the secondary batteries of the electric power accumulating apparatus, is composed of a rectifying circuit, a smoothing circuit, a stabilizing circuit etc.

The rectifying circuit can be composed, for example, of a full-wave rectifying circuit such as a bridge rectifying circuit or a center-tapped rectifying circuit, a half-wave rectifying circuit, a voltage-doubling half-wave rectifying circuit, a voltage-doubling full-wave rectifying circuit, or a 3-phase rectifying circuit such as a diode bridge or a hybrid bridge utilizing a bridge arrangement of diodes and thyristors. The smoothing circuit can be composed of capacitors or a combination of capacitors and coils.

The stabilizing circuit can be composed of a control resistance such as a transistor or a diode, connected in series or parallel to the load, in order to prevent the decrease in the output voltage in case a large current is given to the load.

For the rectifying means there can also be utilized a current boost circuit, utilizing rectifying elements and a power supply IC such as a 3-terminal regulator arranged in a bridge circuit.

Noise Elimination Means

In order to avoid erroneous functions of the circuit elements in the electric power accumulating apparatus, there is preferably provided noise elimination means, in a necessary location, for eliminating the noises generated for example by the switching operation.

(Secondary battery)

(Structure and constituents of the battery)

The secondary battery, which is an essential component of the electric power accumulating apparatus of the present invention is basically composed of a cathode 601 composed essentially of an active cathode substance; an anode 603 composed essentially of an active anode substrate; current collecting members 602, 604; electrolyte 605; a separator 608; output terminals 606, 607; and a battery case 609.

The secondary batteries can be classified into those utilizing aqueous solution for the ion-conducting electrolyte liquid 605 and those utilizing non-aqueous solution for said electrolyte liquid 605. In addition there can be employed secondary batteries utilizing solidified electrolyte solution or solid-state electrolyte, instead of the electrolyte liquid 605.

The electrolyte liquid 605 consisting of aqueous solution can be composed, for example, of acidic aqueous solution such as of sulfuric acid, alkaline aqueous solution such as of potassium hydroxide, or aqueous solution such as of zinc bromide. The active cathode substance for the battery with aqueous electrolyte can be composed, for example, of lead, cadmium, hydrogen-absorbing alloy, zinc, iron or magnesium. The active anode substance can be composed, for example, of lead oxide, nickel oxihydroxide, silver oxide, manganese dioxide, oxygen, bromine, chlorine, silver chloride, lead chloride or copper chloride.

When the electrolyte liquid 605 is a non-aqueous system employing an organic solvent, the active cathode substance of the battery is composed of an alkali metal such as lithium or sodium, or an alloy of alkali metal, while the active anode substance is composed of a metal oxide such as nickel oxide, cobalt oxide, titanium oxide, iron oxide, vanadium oxide, manganese oxide, molybdenum oxide, chromium oxide or tungsten oxide; a metal sulfide such as molybdenum sulfide, iron sulfide or titanium sulfide; a hydroxide such as iron oxihydroxide; chlorine; graphite fluoride; thionyl chloride; sulfur dioxide; sulfur; or a conductive polymer such as polyacetylene, polyaniline, polypyrrole or polythiophene. The electrolyte can be composed of an acid such as $H_2SO_4$, HCl or $HNO_3$; a salt of lithium ion ($Li^+$) and a Lewis acid ion ($BF_4^-$, $PF_6^-$, $AsF_6^-$ or $ClO_4^-$); a mixture thereof; or a salt of a cation such as sodium ion, potassium ion or tetraalkylammonium ion and a Lewis acid ion. The solvent for the electrolyte can be acetonitrile, benzonitrile, propylene carbonate, ethylene carbonate, dimethylformamide, tetrahydrofurane, γ-butyrolactone, dioxolane, or sulfolane or a mixture thereof.

For preventing the leakage of the electrolyte 605, it may be formed as gel by a gelling agent.

Each of the cathode and the anode is formed by molding a mixture of the active substance, conductive powder for example of carbon or a metal, and a binder such as polyolefin or fluorinated resin, in contact with a metallic current collecting member. However said conductive powder and binder may be dispensed with if the active cathode substance itself is conductive and allows easy molding as in the case of lithium.

The separator 608 serves to prevent the shortcircuiting of the cathode and the anode, and also serves, in some cases, to retain the electrolyte liquid. As the separator is required to have pores for enabling movement of the ions involved in the battery reaction and to be insoluble and stable in the electrolyte liquid, there is employed non-woven cloth or a material with micropore structure, for example of glass, polypropylene, polyethylene, fluorinated resin or polyamide.

The battery case 609 can be composed of a metal can serving also as the output terminal, or a plastic case.

The external can and the cap can be composed of stainless steel, particularly titanium-clad stainless steel or copper-clad stainless steel, zinc or nickel-plated steel plate.

The plastic case can be composed of a plastic material such as polypropylene or polyethylene, or a composite material of plastics and metal or glass fibers.

An electric power accumulating apparatus of a long service life and a high energy density can be obtained by employing, as the secondary batteries, lithium batteries utilizing lithium as the active cathode substance, surfacially covered with a film allowing penetration of lithium ions.

The actual form of the batteries can be flat, cylindrical, rectangular or sheet-shaped. A cylindrical form with spiral structure, in which the cathode and the anode, with the separator therebetween, are spirally wound, allows to increase the areas of the electrodes, thereby accepting a large current at the charging and discharging. On the other hand, the rectangular form enables effective utilization of the space in the equipment containing such secondary batteries. The internal structure can be single-layered or multi-layered.

Figure 7:
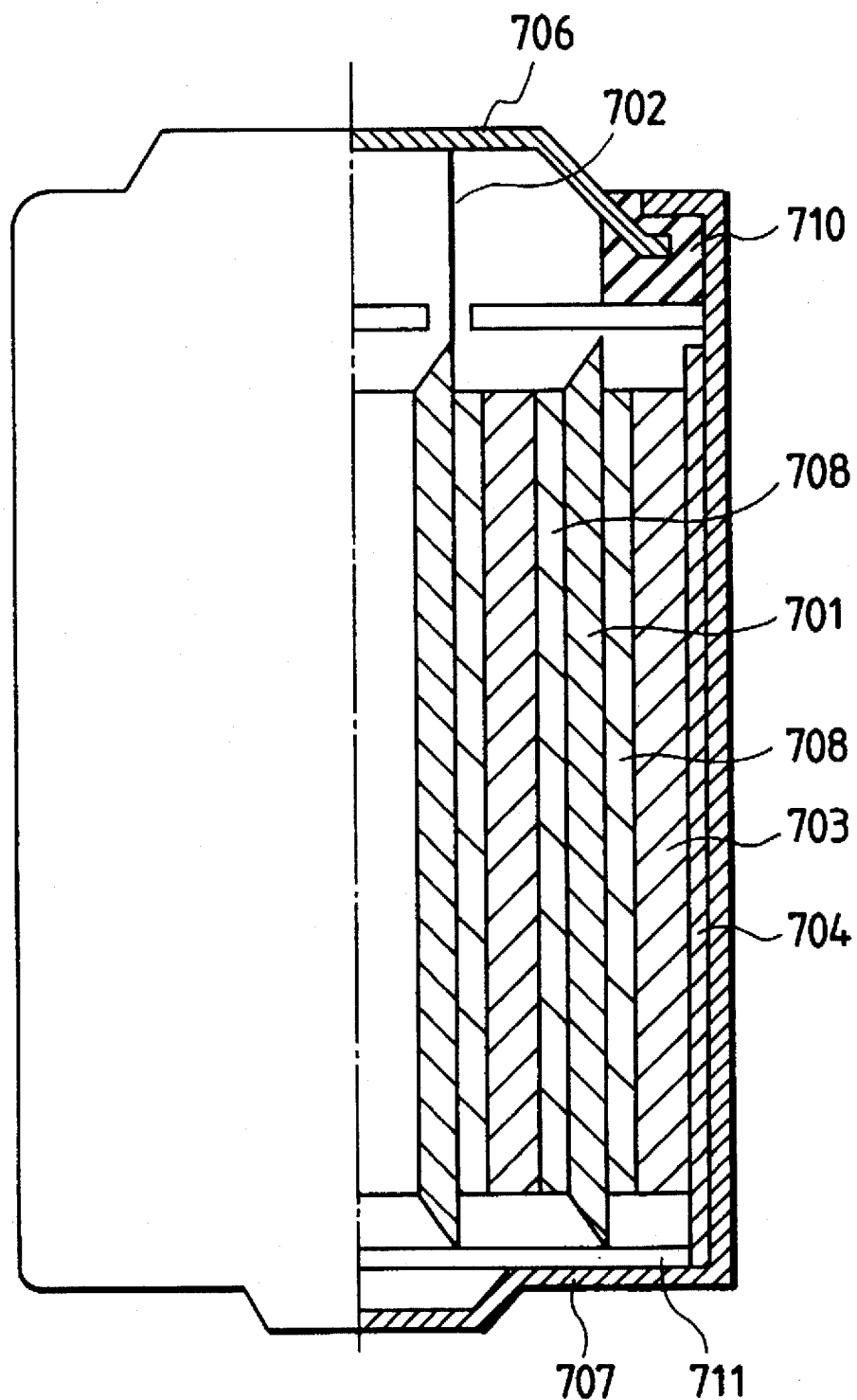
FIG. 7 is a schematic cross-sectional view of a spiral cylindrical secondary battery employable in the present invention.
Figure 8:
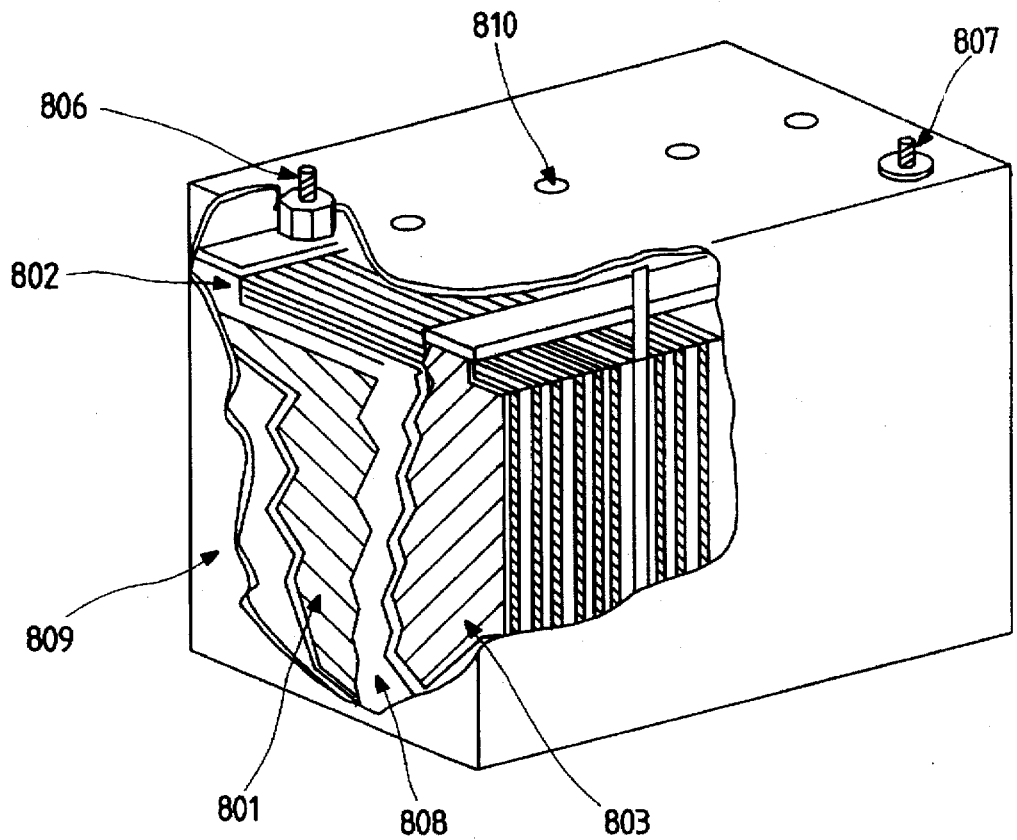
FIG. 8 is a schematic view of a rectangular secondary battery employable in the present invention.
Figure 9:
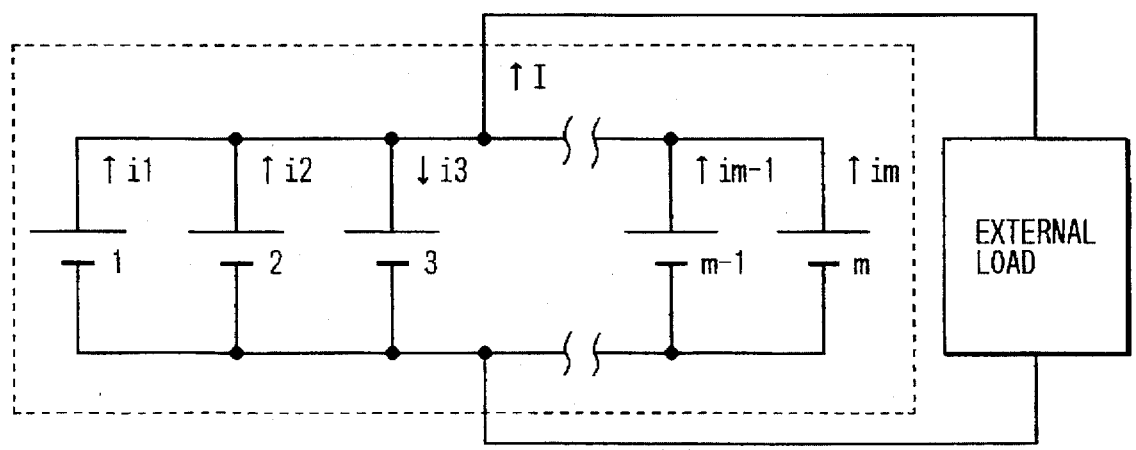
FIG. 9 is a circuit diagram in case of power supply from plural secondary batteries, connected in parallel, to an external load.
Figure 10:
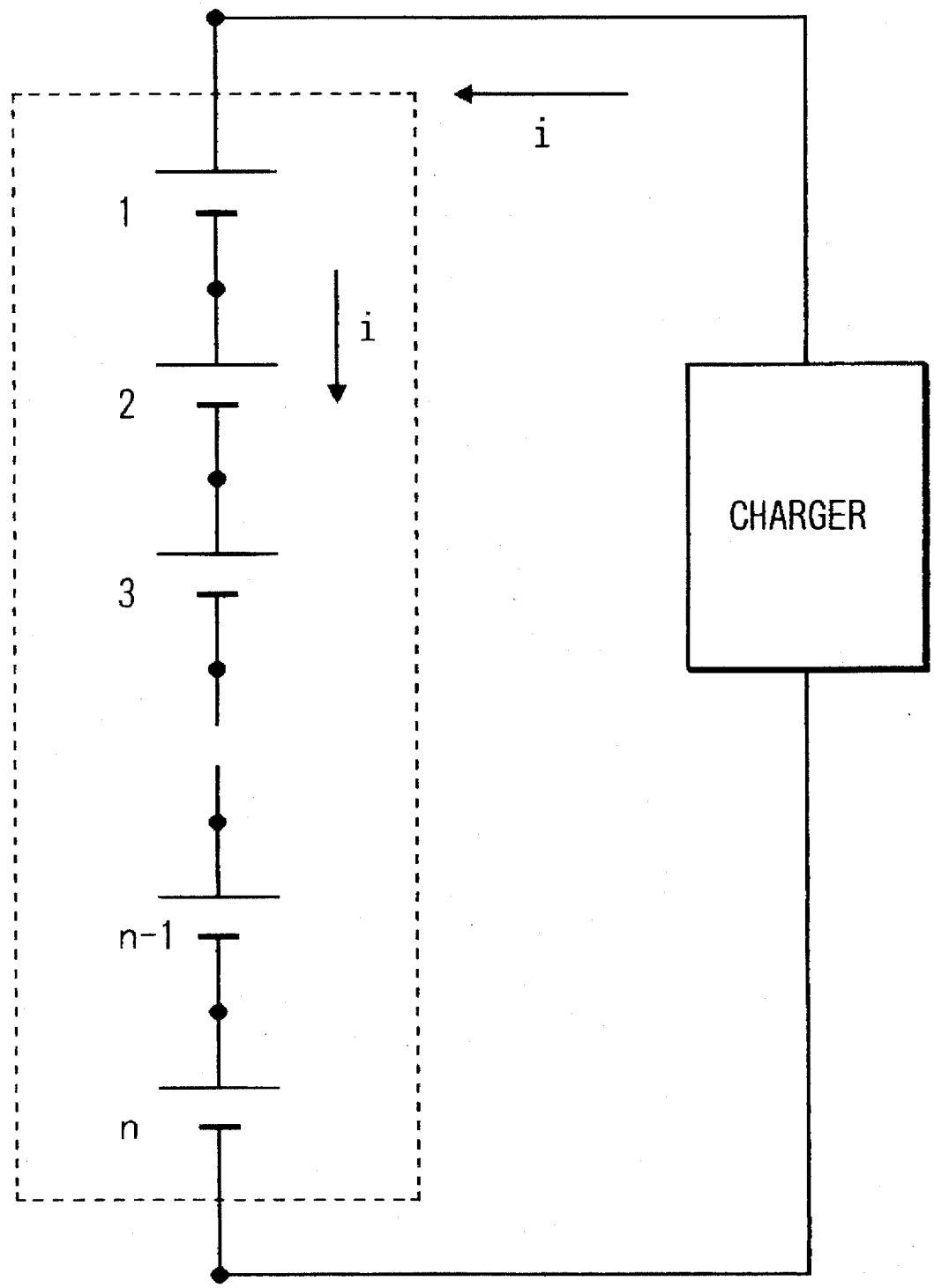
FIG. 10 is a circuit diagram in case of power supply from plural secondary batteries, connected in series, to an external load.

FIGS. 7 and 8 are schematic views, respectively showing examples of the internal structure of a cylindrical battery with spiral structure and a rectangular battery for high output. In FIG. 7 there are shown a cathode 701 essentially composed of the active cathode substance; current collecting members 702, 704; an anode 703 essentially composed of the active anode substance; a cathode terminal (cathode cap) 706; an external can (anode can) 707 constituting the battery case; a separator 708 retaining the electrolyte therein; an insulating packing 710; and an insulating plate 711. In FIG. 8 there are shown a cathode 801 composed essentially of the active cathode substance; a current collecting member 802; an anode 803 composed essentially of the active anode substance; a cathode terminal 806; an anode terminal 807; a separator 808 retaining the electrolyte therein; a battery case 809; and a safety valve 810. Said safety valve has a structure utilizing rubber, a spring or a metal ball and adapted to be opened when the internal pressure of the battery is elevated, thereby releasing the pressure.

The battery can be sealed by caulking with a gasket such as an insulating packing, or by sealing with adhesive material, welding, soldering or glass fusing.

Now the present invention will be clarified further by embodiments thereof, which, however, do not limit the present invention.

As an example of the present invention, there was prepared an electric power accumulating apparatus of the configuration shown in FIG. 5, excluding, however, the DC-DC converter. Said electric power accumulating apparatus of FIG. 5 excluding the DC-DC converter was composed of a DC power source circuit consisting of a rectifying circuit for converting the commercial AC current into a DC current as the charging power source, a smoothing circuit and a stabilizing circuit; a charging circuit for charging the secondary battery array with the output of said DC power source circuit or an external DC power source such as a fuel cell; a secondary battery array for accumulating the electric power, equipped with switching elements and sensors; an auxiliary DC power source for voltage compensation; an inverter for converting the DC output current into an AC current for driving an AC-operated equipment; and a control circuit for controlling the above-mentioned circuits. There was also provided a driving power source, consisting of an unrepresented secondary battery, for driving the control circuit and the switching elements.

The circuits associated with the secondary battery array in FIG. 5 were constructed as shown in FIG. 4, and the secondary battery array was constructed as shown in FIGS. 3A and 3B by parallel connection of four serial connections, each containing 24 secondary batteries in series. In the configuration shown in FIG. 4, each unit battery was composed of a lithium secondary battery employing metallic lithium surfacially covered with a lithium ion permeating film as the active cathode substance and lithium-manganese oxide as the active anode substance, and each switching element was composed of a two-coil latching relay. The temperature sensors were composed of thermocouples.

The auxiliary DC power source shown in FIG. 5 employed a nickel-cadmium secondary battery.

The control circuit shown in FIG. 5 was provided with a driver for the switching elements connected to the unit batteries; a circuit for detecting the thermal electromotive forces of the thermocouples and comparing said electromotive forces with a reference voltage; a circuit for detecting and comparing the currents and voltages of the unit batteries with reference values; a stabilizing circuit for balancing the current and the voltage of the secondary battery array when the abnormal battery is detached; a circuit for controlling the charging and discharging; an inverter, a circuit for controlling the DC power source; and a circuit for controlling the display elements.

The inverter was of the PWM type utilizing IGBT (insulated gate bipolar transistor).

The charging was conducted by the method of charging a predetermined amount of electricity with a constant voltage, with measurement of the current with an integrating circuit.

There was also provided a circuit for counting the number of the chargings and dischargings of each battery, in order to predict the timing of replacement thereof.

The electric power accumulating apparatus of the above-explained structure was operated in the following manner.

The charging was conducted by connecting a commercial power of AC 200V to the input terminals of the apparatus, rectifying the AC current with the rectifying circuit consisting of a transformer and bridge-arranged diodes, then passing the obtained current through the smoothing circuit consisting of a choke coil and capacitors and also the DC stabilizing circuit, and applying thus obtained current with a constant voltage through the charging circuit to the terminals of the secondary battery array in such a manner that each serial connection containing 24 batteries receives a constant current and that each battery is charged with a predetermined amount of electricity. In the charging operation, any battery showing abnormal temperature was electrically detached and the terminals were shortcircuited by the relay constituting the switching element. The charging currents of the unit batteries were inspected by the scanner and the current detecting circuit. The voltages of the batteries after the charging operation were measured by the scanner and the voltage detecting circuit, and any battery not showing proper voltage can be electrically detached by the switching element, and the output voltage can be compensated by the auxiliary DC power source.

In case the electric power accumulating apparatus in the accumulated state is used for example for driving an AC motor, the DC output of the secondary battery array is converted into an AC current. In the course of the discharging operation of the apparatus, if any unit battery becomes incapable of providing the output current, such unit battery with lowered output is detected by the measurement of the currents and voltages of the secondary battery array in such discharging state, and is electrically detached by the actuation of the relay constituting the switching element. At the same time the deficient voltage is compensated by the auxiliary DC power source, whereby the decrease in the output of the apparatus can be suppressed.

As explained in the foregoing, it is rendered possible, by detecting abnormality in the unit batteries constituting the secondary battery array of the electric power accumulating apparatus in the charging and discharging operations, detaching the abnormal unit battery and compensating the deficiency in voltage resulting from such battery detachment, to prevent troubles such as heating or fire of the batteries, to extend the service life of the charging and discharging cycles of the entire secondary battery array, and to ensure stable output.

As explained in the foregoing, the present invention allows to realize an electric power accumulating apparatus with an elevated output by serial-parallel connection of plural secondary batteries, featured by improved safety, stabilized output electric power and extended service lives of the plural secondary batteries.

The present invention is particularly effective in an electric power accumulating apparatus employing, in parallel-serial connection, a secondary battery prone to generate dendolite at the charging thereby causing shortcircuiting, such as lithium battery, nickel-zinc battery, air-zinc battery, bromine-zinc battery or silver oxide-zinc battery. Also the present invention can improve safety in an electric power accumulating apparatus employing lithium batteries with combustible solvent.

What is claimed is:

1. An electric power accumulating apparatus provided with a parallel arrangement of plural groups each of which includes at least one secondary battery, comprising:
    means for detecting an abnormality in each secondary battery of said plural groups;
    means for electrically disconnecting one of at least three terminals connecting a secondary battery showing abnormality to the group from the secondary battery showing abnormality, and for connecting the other two terminals to shunt said secondary battery showing abnormality; and
    one of an auxiliary power source and DC/DC converter for compensating the voltage corresponding to said detached battery,
    wherein at least one diode is provided at least at one end of each group to prevent reverse current flow.

2. An apparatus according to claim 1, wherein said auxiliary power source has a secondary battery.

3. An apparatus according to claim 1, wherein said means for detaching of the secondary battery showing abnormality, eventually with shortcircuiting of the terminals includes a switching element.

4. An apparatus according to claim 1, wherein said means for detecting abnormality of said secondary batteries is means adapted to measure the state of at least one of the voltage, current, temperature and strain of each of the secondary batteries.

5. An apparatus according to claim 1, further comprising means for requesting replacement of the secondary battery showing abnormality.

6. An apparatus according to claim 1, further comprising means for connecting, after said secondary battery showing abnormality is replaced by a normal one, the output terminals of the normal one to the battery array thereby restoring the apparatus.

7. An apparatus according to claim 1, further comprising means for informing the timing of replacement of the secondary batteries constituting said apparatus.

8. An apparatus according to claim 1, further comprising rectifying means.

9. An apparatus according to claim 1, further comprising stabilizing means for providing a stable constant voltage.

10. An apparatus according to claim 1, further comprising means for controlling charging and discharging of the apparatus.

11. An apparatus according to claim 1, further comprising an inverter for elevating the output voltage and converting the output current into an AC current.

12. An apparatus according to claim 1, further comprising noise eliminating means.

13. An apparatus according to claim 1, further comprising means for displaying the amount of accumulated electricity.

14. An apparatus according to claim 1, further comprising a DC-DC converter.

15. An apparatus according to claim 1, wherein said secondary batteries are selected from a group consisting of lithium battery, nickel-zinc battery, air-zinc battery, bromine-zinc battery and silver oxide-zinc battery.

16. An apparatus according to claim 1, wherein said secondary batteries are unit batteries of a substantially same capacity.

17. An electric power system including a power source apparatus provided with a parallel arrangement of groups each of which includes at least one secondary battery, and a load electrically connected to said power source apparatus,
    wherein said power source apparatus comprises:
    means for detecting an abnormality in each secondary battery of the groups;
    means for electrically disconnecting one of at least three terminals connecting a secondary battery showing abnormality to the group from the secondary battery showing abnormality and, for connecting the other two terminals to shunt said secondary battery showing abnormality; and
    one of an auxiliary power source and a DC/DC converter for compensating the voltage corresponding to said detached battery, and
    wherein at least one diode is provided at least at one end of each group to prevent reverse current flow.

18. An electric power system according to claim 17, wherein said auxiliary power source has a secondary battery.

19. An electric power system according to claim 17, wherein said means for detaching the secondary battery showing abnormality, eventually with shortcircuiting of the terminals includes a switching element.

20. An electric power system according to claim 17, wherein said means for detecting abnormality of said secondary batteries is means adapted to measure the state of at least one of the voltage, current, temperature and strain of each of the secondary batteries.

21. An electric power system according to claim 17, further comprising means for requesting replacement of the secondary battery showing abnormality.

22. An electric power system according to claim 17, further comprising means for connecting, after said secondary battery showing abnormality is replaced by a normal one, the output terminals of the normal one to the battery array thereby restoring the apparatus.

23. An electric power system according to claim 17, further comprising means for informing the timing of replacement of the secondary batteries constituting said apparatus.

24. An electric power system according to claim 17, further comprising rectifying means.

25. An electric power system according to claim 17, further comprising stabilizing means for providing a stable constant voltage.

26. An electric power system according to claim 17, further comprising means for controlling charging and discharging of said apparatus.

27. An electric power system according to claim 17, further comprising an inverter for elevating the output voltage and converting the output current into an AC current.

28. An electric power system according to claim 17, further comprising noise eliminating means.

29. An electric power system according to claim 17, further comprising means for displaying the amount of accumulated electricity.

30. An electric power system according to claim 17, further comprising a DC-DC converter.

31. An electric power system according to claim 1, wherein said secondary batteries are selected from a group consisting of lithium battery, nickel-zinc battery, air-zinc battery, bromine-zinc battery and silver oxide-zinc battery.

32. An electric power system according to claim 17, wherein said secondary batteries are unit batteries of a substantially same capacity.

33. An apparatus according to claim 1, wherein said DC/DC converter is a booster circuit.

34. An apparatus according to claim 1, wherein plural secondary batteries are arranged in series in each of said groups.

35. An apparatus according to claim 1, wherein said at least one diode comprises a diode connected so as to be forwardly biased by a discharge current for each group at a discharge mode, and a diode connected so as to be forwardly biased by charging current for each group at a charging mode.

36. An apparatus according to claim 1 wherein the DC-DC converter has a voltage elevating circuit.

37. An apparatus according to claim 1 wherein said means for electrically disconnecting includes a switching element of a relay.

38. An apparatus according to claim 1 wherein said means for electrically disconnecting comprises a latching relay.

39. An apparatus according to claim 1 wherein said means for electrically disconnecting includes a two-coil type latching relay.

40. An apparatus according to claim 1 wherein said means for electrically disconnecting includes a switching element comprising a transistor.

41. An apparatus according to claim 1 wherein said means for electrically disconnecting includes a switching element comprising a thyristor.

42. An apparatus according to claim 17 wherein plural secondary batteries are arranged in series in each of said groups.

43. An apparatus according to claim 17, wherein said at least one diode comprises a diode connected so as to be forwardly biased by a discharge current for each group at a discharge mode, and a diode connected so as to be forwardly biased by charging current for each group at a charging mode.

44. An apparatus according to claim 17 wherein the DC-DC converter has a voltage elevating circuit.

45. An apparatus according to claim 17 wherein said means for electrically disconnecting comprises a switching element of a relay.

46. An apparatus according to claim 17 wherein said means for electrically disconnecting includes a latching relay.

47. An apparatus according to claim 17 wherein said means for electrically disconnecting includes a two-coil type latching relay.

48. An apparatus according to claim 17 wherein said means for electrically disconnecting includes a switching element comprising a transistor.

49. An apparatus according to claim 17 wherein said means for electrically disconnecting includes a switching element comprising thyristor.

* * * * *

UNITED STATES PATENT AND TRADEMARK OFFICE
CERTIFICATE OF CORRECTION

PATENT NO. : 5,744,936
DATED : April 28, 1998
INVENTOR(S) : SOICHIRO KAWAKAMI

Page 1 of 2

It is certified that error appears in the above-identified patent and that said Letters Patent is hereby corrected as shown below:

COLUMN 1

Line 23, "resultion" should read --resulting from an--; and
Line 24, "from the" should be deleted.

COLUMN 5

Line 31, "which" should read --which is--.

COLUMN 6

Line 25, "shortcircuits" should read --shortcircuiting--.

COLUMN 7

Line 26, "achieved by" should be deleted;
Line 34, "to" should read --of--; and
Line 48, "means a" should read --means, a--.

COLUMN 10

Line 22, "substrate;" should read --substance;--; and
Line 61, "tetrahydrofurane," should read --tetrahydrofurane, dimethoxyethane,--.

UNITED STATES PATENT AND TRADEMARK OFFICE
CERTIFICATE OF CORRECTION

PATENT NO. : 5,744,936
DATED     : April 28, 1998
INVENTOR(S) : SOICHIRO KAWAKAMI Page 2 of 2

It is certified that error appears in the above-identified patent and that said Letters Patent is hereby corrected as shown below:

<u>COLUMN 14</u>

Line 53, "abnormality and," should read
--abnormality, and--.

Signed and Sealed this

Twenty-ninth Day of December, 1998

Attest:

BRUCE LEHMAN

*Attesting Officer*     Commissioner of Patents and Trademarks